United States Patent [19]

Ward

[11] Patent Number: 4,792,002
[45] Date of Patent: Dec. 20, 1988

[54] PROPORTIONATE ROCKER BALANCE

[76] Inventor: William Ward, 3101 Jefferson, Costa Mesa, Calif. 92626

[21] Appl. No.: 100,289

[22] Filed: Sep. 23, 1987

[51] Int. Cl.[4] ..................... G01G 19/00; G01G 23/14; G01G 1/18
[52] U.S. Cl. .................................. 177/200; 177/172; 177/251
[58] Field of Search ............... 177/127, 172, 199, 200, 177/246, 251

[56] References Cited

U.S. PATENT DOCUMENTS

| | | | |
|---|---|---|---|
| 481,618 | 8/1892 | Jadwin | 177/127 |
| 1,793,276 | 2/1931 | Chott | 177/172 X |
| 2,011,649 | 8/1935 | Phillips | 177/172 X |
| 2,636,724 | 4/1953 | Eacrett | 177/200 |

FOREIGN PATENT DOCUMENTS

| | | | |
|---|---|---|---|
| 0672407 | 11/1965 | Belgium | 177/246 |
| 0532754 | 1/1941 | United Kingdom | 177/127 |

Primary Examiner—George H. Miller, Jr.
Attorney, Agent, or Firm—Price, Gess & Ubell

[57] ABSTRACT

A proportionate balance is provided with which an arbitrary amount of one component can be proportioned with a precise weight of another component. A rocker member supports the balance and eliminates the need for knife edges or other typically fragile pivot points.

12 Claims, 2 Drawing Sheets

PROPORTIONATE ROCKER BALANCE

BACKGROUND OF THE INVENTION

1. Field of the Invention

This invention relates to weighing scales, and more specifically, to proportionate balances.

2. Description of the Prior Art

Proportionate balances are used to proportion weights of materials without the need to determine absolute weight values. Materials are placed on opposite sides of a pivoted balance beam. When the beam is balanced, the relative weight of each material is inversely proportional to the horizontal distance of that material from the pivot point. The principle of operation is described and applied in Skinner, U.S. Pat. No. 157,233; Brown, U.S. Pat. No. 657,476; Brown, U.S. Pat. No. 697,318; Chott, U.S. Pat. No. 1,793,276, and more recently, in Kucher, U.S. Pat. No. 2,145,515. Such devices allow precise proportioning of one component relative to an arbitrary amount of another component. While the devices described in the above patents will provide for a satisfactory application of the general principle, they all employ relatively complicated and fragile mechanisms. The balance devices described in the prior art all employ relatively fragile pivot points with which the balance beams are suspended. The use of knife edges is a popular design feature.

SUMMARY OF THE INVENTION

It is an object of the present invention to provide a proportionate balance which is extremely simple in design, simple in operation, durable and inexpensive.

The present invention eliminates the need for traditional pivots. The pivoting function is performed by supporting the balance beam from below on a rocker member. The center of curvature of the rocker member acts as a virtual pivot point located at some distance above the point of support. Because no actual support is provided at the virtual pivot point and the pivot point is separated from the point of support, a more robust construction is possible.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

The profile of the rocker member has a profound influence on the function of the balance. The radius of curvature of the rocker member determines the location of the virtual pivot point. The further the virtual pivot point is above the center of gravity, the more stable the balance.

The rocker member profile does not necessarily have to describe a circular segment. A profile of variable curvature would in effect alter the position of the virtual pivot point as a function of the degree of imbalance of the device. A properly designed rocker member profile, as for example of hyperbolic curvature, would therefore impart relative stability while the components are out of balance and induce more and more sensitivity as the balance point is approached.

Depending on the intended use for the proportionate balance and the criticality of the point of balance, a number of different methods can be employed with which the point of balance can be determined. At one extreme, reliance on visual estimation of the horizontalness of the balance beam would suffice while the incorporation of a bubble indicator would provide a more accurate balance point determination.

In its simplest form, the present invention can be of one-piece construction with no moving parts. In a more elaborate form, provisions could be included with which the desired proportion can be altered and the weight of any dry containers can be compensated for.

A balance of the present invention can, for example, be used to proportion water to ground coffee, cement to water, oil to gasoline or any other utility wherein an arbitrary amount of one component needs to be proportioned with a precise amount of another component.

Figure 1:
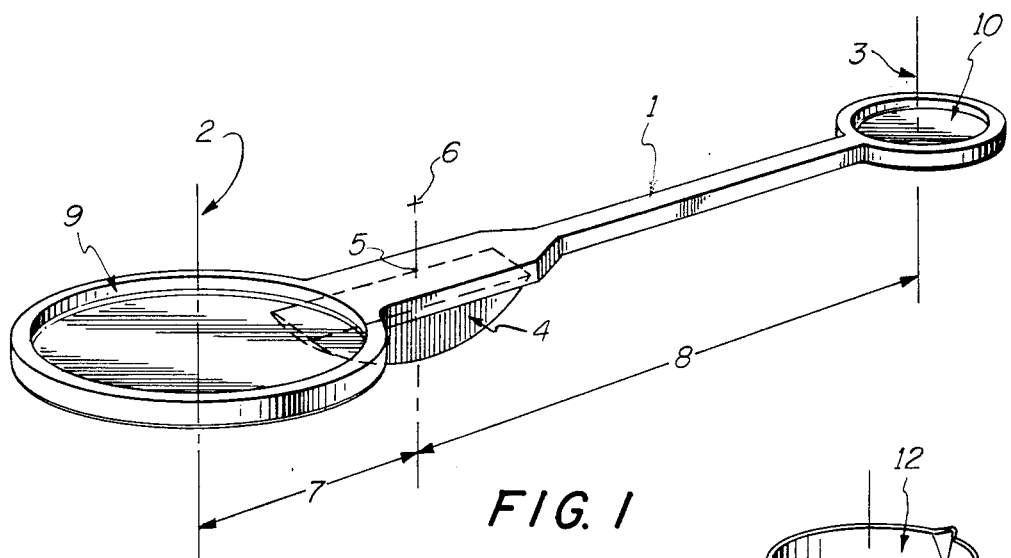
FIG. 1 is a perspective view of an embodiment of the present invention.

Referring now to FIG. 1, which illustrates the present invention in its simplest form, a balance beam 1 supports two trays 9 and 10. The weight of a first component placed on tray 9 will balance a weight of a second component placed on tray 10 in a ratio equivalent to the ratio of distance 8 to distance 7. Distance 7 is the distance of the center of gravity of the first component 2 from the center gravity of the balance 5. Distance 8 is the distance of the center of gravity of the second component 3 from the center of gravity of the balance 5. The profile of rocker member 4 determines the location of the virtual pivot point 6 and whether or not the location of this point changes as a function of the degree of imbalance.

The FIG. 1 proportionate balance is a single piece construction, with no moving parts. The rocker member 4 describes a circular segment with its radius of curvature 6 located at some distance above the balance. The weight distribution of the balance itself must be such that the balance beam 1 is horizontal when the trays 9 and 10 are empty. Alternatively, if it is intended that certain specific containers be used in conjunction with this balance, their weights must be taken in consideration in the weight distribution of the balance itself to assure a horizontal balance beam when the empty containers are placed on the trays.

Figure 2:
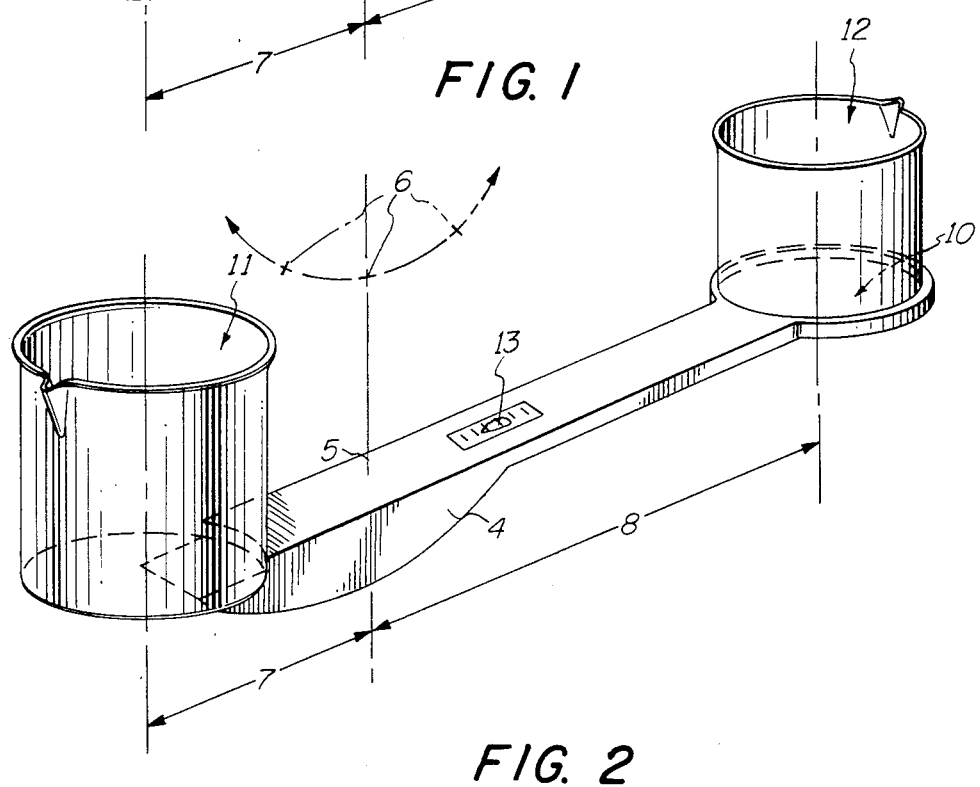
FIG. 2 is a perspective view of another embodiment of invention.

FIG. 2 depicts a proportionate balance adapted, for example, to perform the precise proportioning of gasoline to oil as required for use in two-stroke combustion engines. A first container 11 is an integral part of the balance, the weight being distributed throughout the whole device such that the balance beam is horizontal when the empty detachable second container 12 is placed on tray 10. The rocker member 4's profile describes a substantially hyperbolic curve such that the virtual pivot point 6 is high above the balance when the two component weights are out of balance and considerably lower when the point of balance is approached. This configuration imparts stability while the two components are out of balance but provides high precision as the point of balance is approached.

A bubble indicator 13 is provided so that the precise point of balance can be ascertained. The ratio of distance 8 to distance 7 is precisely equal to the weight ratio of gasoline to oil required for a particular engine.

An arbitrary amount of gasoline is added to container 11 after which a quantity of oil is added to container 12 in sufficient quantity to bring the balance beam 1 to a horizontal position, i.e., center the bubble in the bubble indicator 13. The oil in the container 12 is subsequently mixed in with the gasoline in container 11 after which the entire mixture can be added to a fuel tank.

Figure 3:
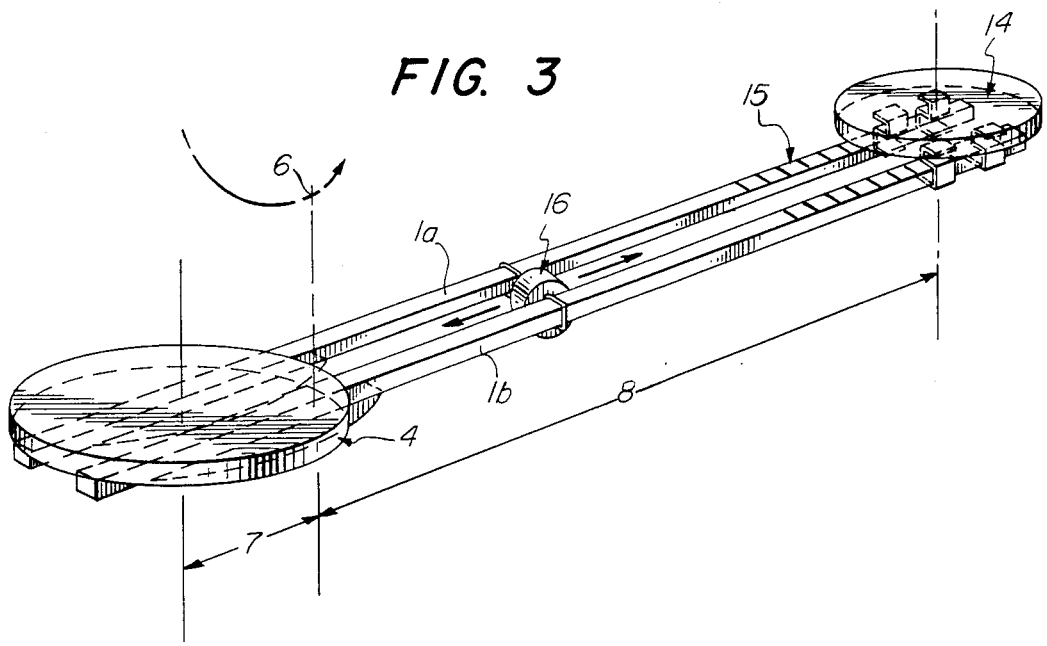
FIG. 3 is a perspective view of yet another embodiment of invention.

FIG. 3 describes a proportionate balance incorporating means for adjusting the desired proportioning. Tray 14 is slidably mounted on the parallel balance beams 1a and 1b. By adjusting the position of tray 14, the distance 8 and, hence, the ratio of distance 8 to distance 7 will be altered. These ratios are demarked 15 on the balance beam 1 so that a specific ratio can be quickly and repeatably selected. A counterweight 16 is slidably affixed to the balance beam such that the balance can be "zeroed" after a particular position of tray 14 has been selected.

The counterweight 66 can, of course, be employed to further compensate for the dry weights of any container used to hold the components to be proportioned. The use of two widely spaced balance beams 1a and 1b imparts lateral stability to the device and does not affect its operation in any manner. The rocker members 4 depicted in FIG. 3 have a non-circular asymmetric profile. The path of the virtual pivot point 6 provides for a non-linear response enabling the sensitivity to vary with the balance beam position, as described earlier.

Figure 4:
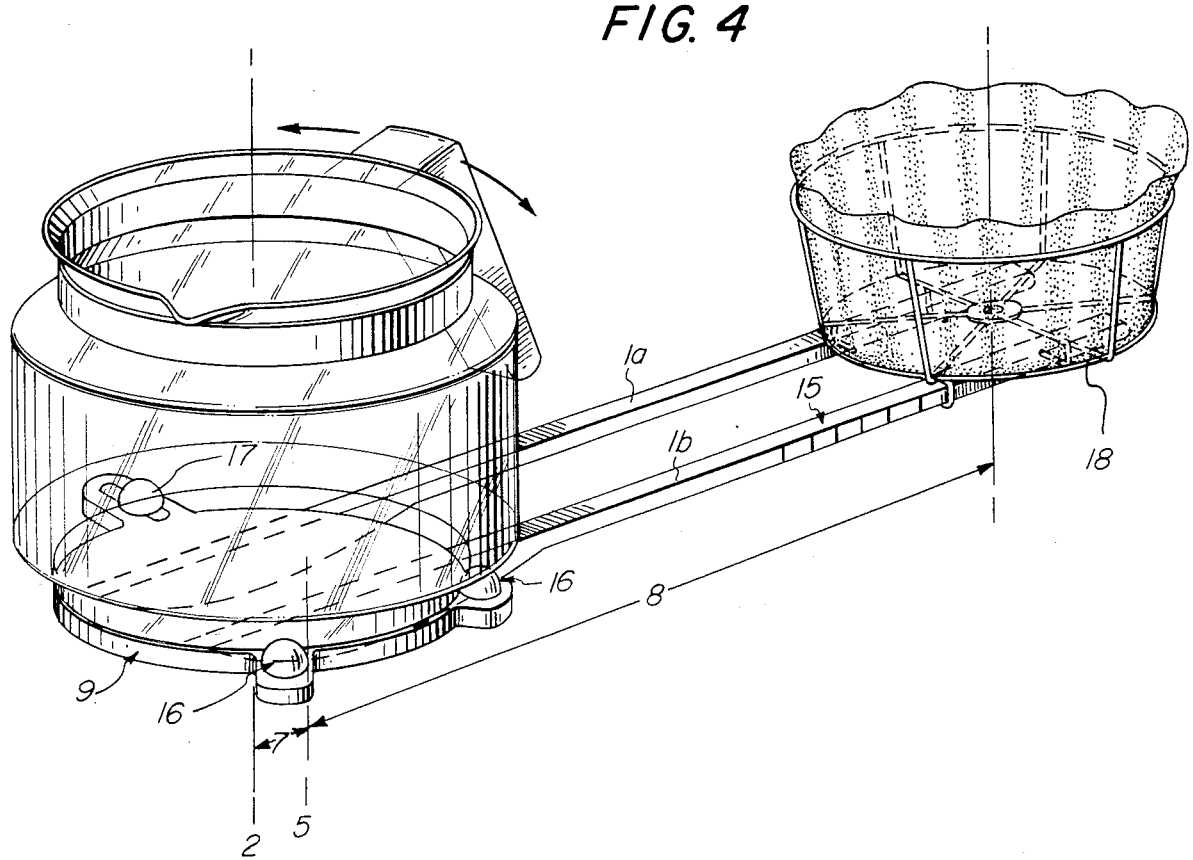
FIG. 4 is a perspective view of another embodiment of the present invention.

FIG. 4 illustrates the preferred embodiment of the present invention as adapted for the proportioning of water to ground coffee. Tray 9 is equipped with two fixed lugs 16 and an adjustable lug 17 such that a variety of coffee pots can be accommodated thereon. A basket 18 is slidably affixed to the balance beams 1a and 1b. Fiducial marks on the balance beam demark strong, medium and light brews. In operation, an empty coffee filter is placed in the basket 18 and a position of the basket is selected corresponding to the strength of coffee desired, an empty coffee pot is placed on tray 9 and positioned by adjustment of the adjustable lug 17. The balance is "zeroed" by rotating the coffee pot. The typically asymmetric attachment of the handle enables weight to be shifted and in effect acts as an adjustable counterweight.

An arbitrary amount of water is added to the pot. Ground coffee is added in an amount sufficient to bring the balance beams to the horizontal. A consistent ratio is thereby attained. The resulting cup of coffee will be of consistent strength regardless of whether a single cup or a whole pot is brewed.

The above described embodiments can be constructed from a variety of materials. A plastic material would perhaps provide an inexpensive and versatile solution. Wood could be used for its aesthetic qualities. In heavy duty applications, such as the proportioning of cement to water, a metallic alloy would be most appropriate.

Obviously many modifications and variations of the present invention are possible in light of the above teachings. It is therefore to be understood that within the scope of the appended claims, the invention may be practiced otherwise than as specifically described.

What is claimed is:

1. A proportionate balance, for the proportionate weighing of two components, comprising:
   a one piece horizontal beam;
   a first support means, affixed to one end of the horizontal beam, for supporting a first component;
   a second support means, affixed to the other end of the horizontal beam, for supporting a second component; and
   a fulcrum of generally arcuate profile, projecting convexly downwardly from and attached to the horizontal beam in between the first and second support means.

2. The proportionate balance of claim 1 wherein said second support means is variably positionable along said horizontal beam.

3. The proportionate balance of claim 1 wherein a counterweight is slidably affixed to said horizontal beam.

4. The proportionate balance of claim 1 wherein a bubble indicator is affixed to the horizontal beam.

5. The proportionate balance of claim 1, wherein at least one of said support means comprises a container suitable for containing liquid.

6. The proportionate balance of claim 1, wherein the fulcrum profile describes a circular segment.

7. The proportionate balance of claim 1, wherein the fulcrum profile describes a hyperbola.

8. A proportionate balance, for proportioning water to ground coffee, comprising:
   a horizontal beam;
   an arcuate extension projecting convexly downwardly to provide a rocking support for said horizontal beam;
   a first support means, affixed to one end of said horizontal beam, for supporting a coffee pot;
   a second support means, slidably affixed to the other end of said horizontal beam, for supporting a coffee filter; and fiducial marks on said horizontal beam to indicate predetermined positions to which the second support means may be moved to vary the desired ratio of coffee to water.

9. The proportionate balance of claim 8, wherein a second horizontal beam is positioned in parallel with the horizontal beam of claim 6, to which the first support means is affixed and the second support means is slidably affixed, and a second arcuate extension projecting convexly downwardly to provide support for the second horizontal beam.

10. The proportionate balance of claim 8, wherein the first support means for supporting a coffee pot comprises a substantially flat platform having three raised lugs to locate the pot in the center of the platform.

11. The proportionate balance of claim 8, wherein the second support means for supporting a coffee filter comprises a wire basket.

12. The proportionate balance of claim 8, wherein a counterweight is slidably affixed to said horizontal beam.

* * * * *